March 7, 1933. K. C. D. HICKMAN 1,900,877
NONHALATION MOTION PICTURE FILM
Filed May 13, 1931
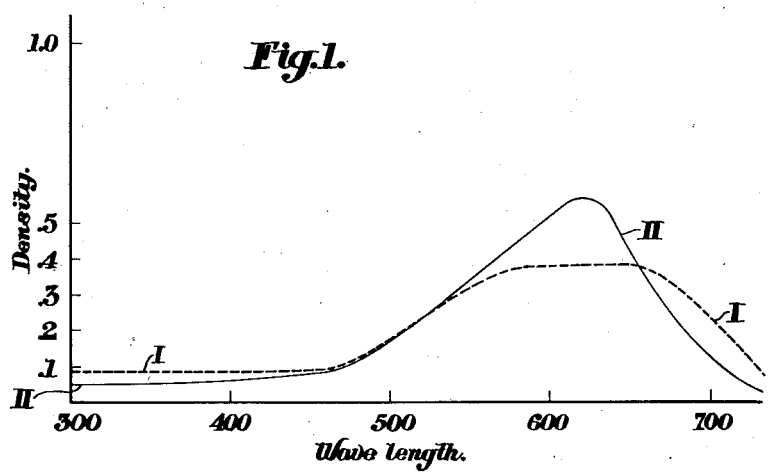
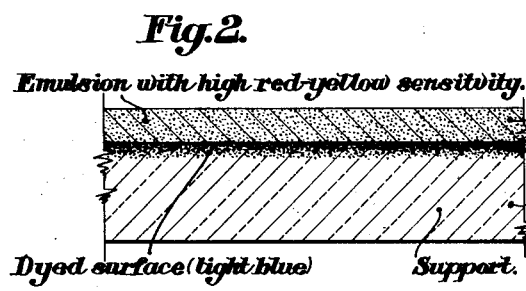
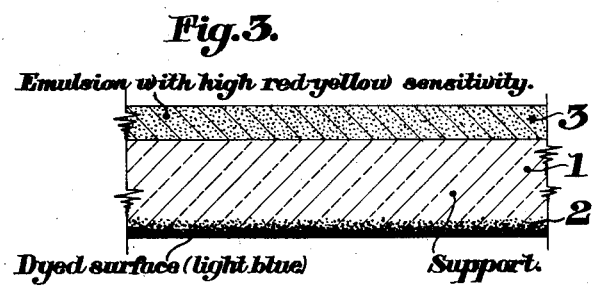
Inventor,
Kenneth C. D. Hickman,
By [signature]
Attorney Patented Mar. 7, 1933

1,900,877

UNITED STATES PATENT OFFICE

KENNETH C. D. HICKMAN, OF ROCHESTER, NEW YORK, ASSIGNOR TO EASTMAN KODAK COMPANY, OF ROCHESTER, NEW YORK, A CORPORATION OF NEW YORK

NONHALATION MOTION PICTURE FILM

Application filed May 13, 1931. Serial No. 537,048.

This invention relates to non-halation motion picture film and in particular to the use therein of a permanent layer having light-absorbing qualities in certain defined regions of the spectrum, rendering the film particularly useful under present conditions of motion picture film practice. The usefulness of the invention which I will describe depends, first, on recent advances in the manufacture of sensitive photographic emulsion whereby negative emulsions are often highly, and sometimes predominantly, sensitive to regions of the spectrum to which negative material has been hitherto relatively insensitive, and, second, to the practice in motion picture studios of using artificial light sources which are comparatively poor in the blue rays. Since the negative emulsions formerly used, even when described as panchromatic, were predominantly sensitive in the blue, while the light sources such as incandescent electric bulbs were poorest in this region, it was necessary to use very powerful lights in order to take the pictures at the necessary speed.

The modern emulsions are much more highly sensitive to the yellow-green and red portions of the spectrum than the older ones, and since the light from the incandescent bulbs is particularly rich in rays in this portion, it follows that with unbacked film halation is due almost entirely to the rays of these colors reflected within the support and that the trifling halation which will be caused by the relatively small amount of blue light may be practically neglected so far as the resulting halation is concerned.

Thus, an approximate remedy for halation can be secured by incorporating on either side of, or in the substance of, the film support, a blue dye which will absorb light more or less uniformly throughout the entire visible spectrum, with the exception of a region in the extreme blue. It is a natural property of most blue dyes or mixtures of dyes which result in a blue color that, even in those regions of the spectrum where the transmission is at its maximum, there is, nevertheless, a considerable absorption. In accordance with this invention, I contemplate incorporating a dye layer, which will have a density in the blue region where the transmission is greatest, of between .01 and .15 preferably with a density of .1, and I contemplate that the dye layer shall have a density greater that .3 in the other regions of the spectrum and I prefer that the absorption bands shall meet the transmission band with a sharp cut. The density is defined by the following equation:

$$D = \log \frac{1}{T}$$

where D is density and T is light transmission expressed in the percentage of the light transmitted with respect to the light falling upon the material to be measured.

It is furthermore desirable that it shall not be necessary to dissolve, remove, bleach or destroy the dyes during photographic processing. For the purposes described by me, it is unnecessary that this be done, since positive film, upon which the pictures to be projected are printed, is customarily sensitive only to the blue and ultra-violet and since the anti-halation layer which I utilize transmits rather freely in these regions, it does not interfere with the printing as now customarily practiced.

I have found that mixtures of dyes are generally preferable to single dyes, though I do not exclude the latter. Single dyes which may be used are the following: Spirit blue R (General Dyestuffs, Inc.), Grasol blue, Diazine green. In actual coating 2½ parts of the dye may be mixed with 1000 parts of an equal solvent mixture of acetone and methyl alcohol. An example of a mixture is Spirit blue R and alphazurine with the same solvents.

Another example of a suitable mixture of dyes is given by a solution containing one part of fuchsine and one part of alphazurine in 200 parts of a solvent consisting of equal parts of methyl alcohol and acetone. This may be applied on either side of the support during manufacture, employing any of the well known means for the application of the dye. The solvent will penetrate the support sufficiently to embody permanently the dye in the surface thereof, so that it will not be removed in the ordinary photographic processes, such as are employed in the continuous machines now customarily employed for motion picture purposes.

Film tinted with the mixture just described has a light steel blue color, and, when coated with emulsion, may be exposed in the camera, yielding images which are indistinguishable from the images taken on ordinary film except that those defects which are attributable to halation are absent. Of course, due to the greater speed of the emulsion in the region to which film has hitherto been comparatively insensitive, the amount of illumination and, consequently, heat required may be greatly cut down, thus adding materially to the comfort of the actors.

This blue backed negative film may then be printed in the ordinary manner and will offer so little extra obstruction to the active rays in the printing light that a negative strip made up of scenes taken on this film and ordinary film may be printed continuously with no perceptible alteration in the density from one to the other of the resulting prints. By this I mean to say that, while difference in density could be revealed by sensitive densitometric tests and might be just perceptible in picture form to the skilled eye, the variation would be so much less than one step on the printer that it would not be considered necessary to make any special printing adjustment for this cause. By way of illustration, I will refer to the accompanying drawing in which Fig. 1 is a diagram showing the absorptive characteristics of the dye layer, and Figs. 2 and 3 are sections of film embodying my invention.

In Fig. 1 the dotted curve I is the absorption curve for the described mixture of alphazurine and fuchsine and the full line curve II is the absorption curve for Spirit blue R.

As shown in Fig. 1, it will be seen that the absorption is relatively high for light of the longer wave lengths in the visible portion of the spectrum and is rather low in the blue and decreases still further in the ultra-violet, where it may be as low as possible.

Since there is substantially no ultra-violet light emitted from incandescent bulbs by the light of which the exposures are made, it is obvious that little halation will result, while it is possible to print through the negative with the dye layer intact.

In Fig. 2 is shown the support, the surface of which at 2 is dyed with a light blue layer of the type described and carries an emulsion with high red-yellow sensitivity.

In Fig. 3 the same emulsion is shown on the opposite surface from the dye, the figures being otherwise the same.

In addition to the advantages and objects already described, it has been found that film embodying this invention greatly improves the definition in contrasty images and that furthermore the incorporation of a permanent light blue tint forms a ready means of identifying this film after development and prevents it becoming mixed with the many other specialized films which are found in a cutting room since the introduction of sound pictures. Moreover, the absence of a detachable backing layer on the unexposed film entirely removes the possibility of color abrasion in the slitting and perforating operation during manufacture and in the gate of the camera during exposure. For all of these reasons, this film has been found of great utility at all points in its use in modern methods of making motion pictures.

Having thus described my invention, what I claim as new and desire to be secured by Letters Patent of the United States is:

1. A motion picture negative film adapted for use in making exposures under illumination particularly rich in light of the longer visual wave lengths and comprising a support and a photographic layer thereon highly sensitive to light of the longer visual wave lengths, said support carrying a dye layer having a density in the blue region of the spectrum not greater than .15 and throughout the other visual portions of the spectrum greater than .3, the dye being unaffected by ordinary photographic processes.

2. A motion picture negative film adapted for use in making exposures under illumination particularly rich in light of the longer visual wave lengths and comprising a support and a photographic layer thereon highly sensitive to light of the longer visual wave lengths, a dye layer having a high transmission to violet and ultra-violet and having a density in the blue region between .01 and .15 and in the other visual portion of the spectrum greater than .3, the dye being unaffected by ordinary photographic processes.

Signed at Rochester, New York, this 9th day of May, 1931.

KENNETH C. D. HICKMAN.